United States Patent
Majjasie et al.

(10) Patent No.: US 7,124,150 B2
(45) Date of Patent: *Oct. 17, 2006

(54) METHOD AND SYSTEM FOR DATA MANAGEMENT PERFORM THE FUNCTIONS OF AUTOMATICALLY PROPAGATING CHANGES IN INFORMATION RELATED TO PRODUCT BEING DESIGNED OR MANUFACTURED FROM A CENTRAL LOCATION TO REMOTE AND DISPARATE USER INFORMATION SYSTEMS HAVING VARYING DATA FORMATS

(75) Inventors: Michelle Majjasie, San Jose, CA (US); Dorothy O. Wise, Scotts Valley, CA (US); Raymond Hein, San Jose, CA (US); Raymond Lin, San Jose, CA (US); Joseph L. Fazio, San Jose, CA (US); Jin T. Teh, San Jose, CA (US)

(73) Assignee: Agile Software Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/012,672

(22) Filed: Dec. 14, 2004

(65) Prior Publication Data

US 2005/0135273 A1   Jun. 23, 2005

Related U.S. Application Data

(63) Continuation of application No. 09/632,454, filed on Aug. 4, 2000, now Pat. No. 6,873,997.

(51) Int. Cl.
*G06F 17/30* (2006.01)
*G06F 7/00* (2006.01)
*G06F 19/00* (2006.01)
*G06F 15/16* (2006.01)

(52) U.S. Cl. .................. 707/104.1; 707/10; 707/200; 700/107; 709/217

(58) Field of Classification Search ................ 707/1–5, 707/10, 100–102, 104.1, 200; 700/11–117; 717/100, 103; 705/26–27, 8, 14; 709/203–205, 709/217–220
See application file for complete search history.

(56) References Cited

U.S. PATENT DOCUMENTS 5,933,350 A * 8/1999 Fujimoto et al. ........... 700/121

(Continued)

FOREIGN PATENT DOCUMENTS

EP  1465090  * 10/2004  .................... 17/50

(Continued)

OTHER PUBLICATIONS

Heng Cao et al. "a simulation-based tool for inventory analysis in a server computer manufacturing environment", proceedings of the 35th conference on winter simulation: driving innovation, session: manufacturing applications; 2003, pp. 1313-1318.*

(Continued)

*Primary Examiner*—Srirama Channavajjala
(74) *Attorney, Agent, or Firm*—Stevens Law Group, P.C.

(57) ABSTRACT

A data management system propagates changes in product information. The product information is stored in a central data base for transfer to remote systems having disparate formats and protocols. The system includes an administration module to validate product data stored in the data base. This ensures that the data is accessible by the system. The system also includes a product change module configured to determine whether a change has been made to data related to a product. When changes are discovered, a data management server is alerted to the change. In response to the alert, the data server extracts, formats and transmits the changes in product data from the central data base to an appropriate user system. An application adapter communicating with the user system then receives the changed data from the data server and formats the data according to the user system platform.

6 Claims, 5 Drawing Sheets

U.S. PATENT DOCUMENTS

| | | | | |
|---|---|---|---|---|
| 5,953,707 | A * | 9/1999 | Huang et al. | 705/10 |
| 5,991,751 | A * | 11/1999 | Rivette et al. | 707/1 |
| 5,999,908 | A * | 12/1999 | Abelow | 705/1 |
| 6,067,525 | A * | 5/2000 | Johnson et al. | 705/10 |
| 6,141,647 | A * | 10/2000 | Meijer et al. | 705/1 |
| 6,167,378 | A * | 12/2000 | Webber, Jr. | 705/8 |
| 6,484,177 | B1 * | 11/2002 | Van Huben et al. | 707/10 |
| 6,789,252 | B1 * | 9/2004 | Burke et al. | 717/100 |
| 6,819,967 | B1 * | 11/2004 | Ballas et al. | 700/107 |
| 6,873,997 | B1 * | 3/2005 | Majjasie et al. | 707/104.1 |
| 6,965,807 | B1 * | 11/2005 | Mito et al. | 700/106 |
| 7,010,544 | B1 * | 3/2006 | Wallen et al. | 707/102 |
| 7,024,433 | B1 * | 4/2006 | Arai et al. | 707/203 |
| 2001/0046862 | A1 * | 11/2001 | Coppinger et al. | 455/435 |
| 2004/0177002 | A1 * | 9/2004 | Abelow | 705/14 |
| 2005/0135273 | A1 * | 6/2005 | Majjasie et al. | 370/254 |

FOREIGN PATENT DOCUMENTS

| | | | |
|---|---|---|---|
| WO | WO 99/28861 | * | 6/1999 |
| WO | WO 2005122079 | * | 12/2005 |

OTHER PUBLICATIONS

Agile software launches industry-backed initiative for product information exchange based on XML proposed standard will deliver dramatic supply chain efficiencies, Dec. 10, 1998 2 pages.*

Scott Freedman, "An overview of fully integrated digital manufacturing technology", proceedings of the 1999 winter simulation conference, pp. 281-285.*

Turiono,J, "Accelerating the engineering to manufacturing transition", WESCON'94, Idea/Microelectronics, conference record, Sep. 1994, pp. 368-371.*

Spooner, D L et al. "using views for product data exchange", Computer graphics and applications, IEEE 1997, vol. 17, isue:5, pp. 58-65.*

Long E et al. "application of model-integrated computing in manufacturing systems", Engineerng of computer-based systems, 1999, pp. 53-59.*

* cited by examiner

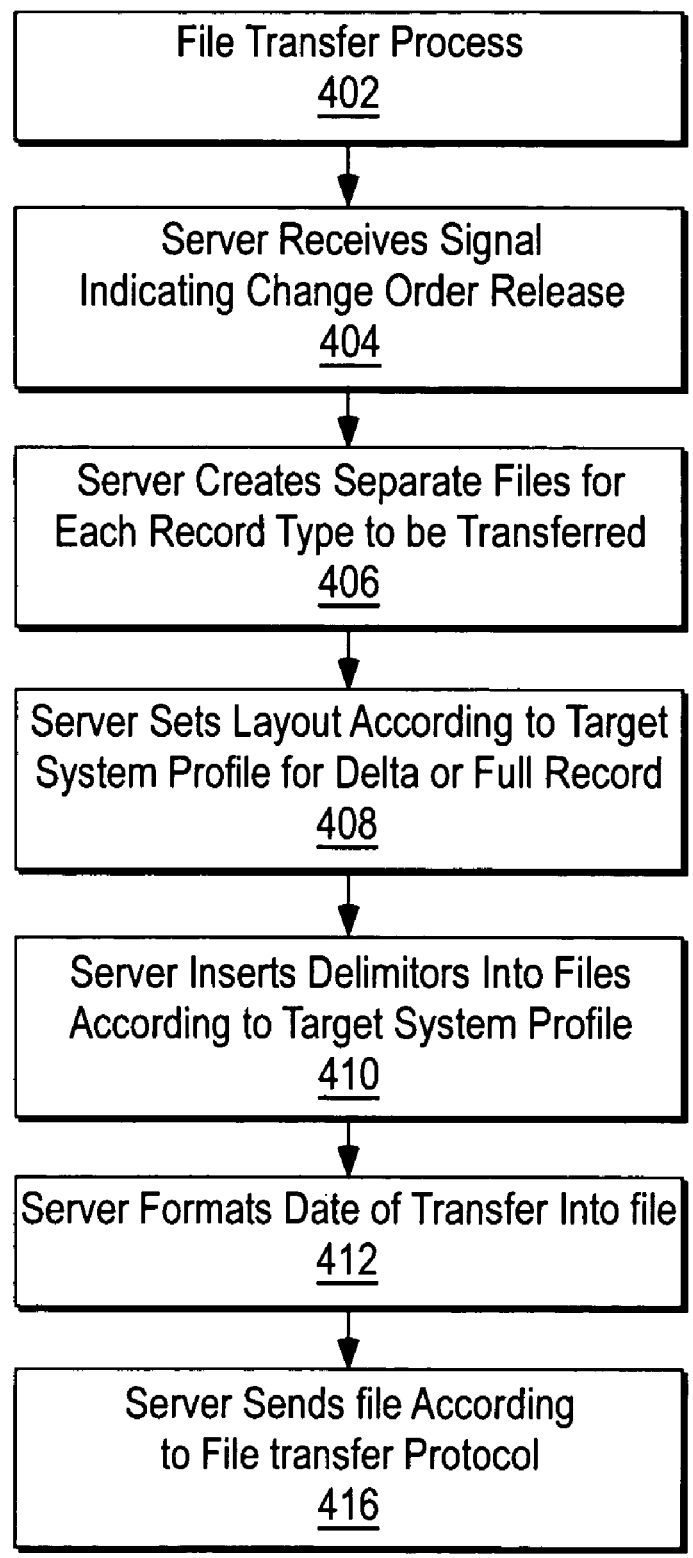

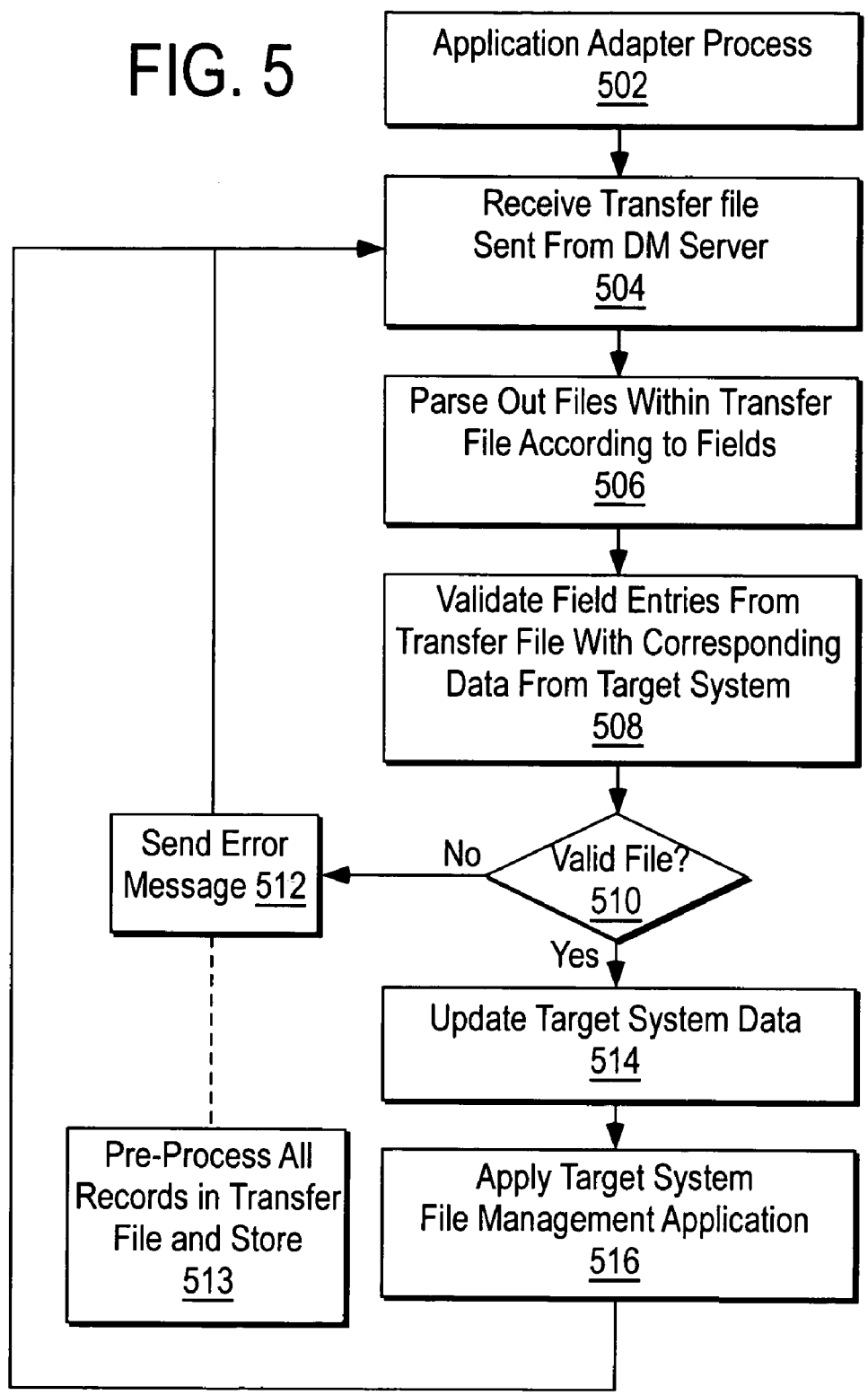

METHOD AND SYSTEM FOR DATA MANAGEMENT PERFORM THE FUNCTIONS OF AUTOMATICALLY PROPAGATING CHANGES IN INFORMATION RELATED TO PRODUCT BEING DESIGNED OR MANUFACTURED FROM A CENTRAL LOCATION TO REMOTE AND DISPARATE USER INFORMATION SYSTEMS HAVING VARYING DATA FORMATS

This application is a continuation of patent application Ser. No. 09/632,454, filed Aug. 4, 2000 now U.S. Pat. No. 6,873,997.

BACKGROUND

The invention generally relates to methods and systems for managing documents electronically and, more particularly, to a method and apparatus for providing maintenance of product data at a central location and the transmission of the data to disparate information systems.

Most business entities have a perpetual need to exchange data among other internal departments and external business partners and affiliates. Manufacturers, for example, have a constant need to interchange their product data both internally and externally in order to keep production flowing efficiently. As business arrangements become more complex, it becomes important to carefully organize data that is shared among different entities.

Problems are particularly troublesome in the manufacturing setting, when changes in product specifications and information related to products or components are changed. Businesses produce what is known as a change order to remedy such a situation. There are several types of change orders. Two such examples that are commonly used in product development environments are engineering change orders ("ECOs") and manufacturing change orders ("MCOs"). ECOs usually involve changes in the design of a product or component that relates to its intended function or purpose. MCOs are typically changes that relate to the manufacturer. It is often important to incorporate change orders as quickly as possible once they are released, if not immediately, in order to save time and money in the business process.

To complicate matters further, these entities often exchange information electronically on different and incompatible formats. Many businesses resolve this problem by augmenting their information systems to actually exchanging paper documents among entities. This of course seems absurd in light of modern day advancements in computer technology. However, most businesses that focus on producing products are reluctant to change their business practices at the administration level in fear of inhibiting their product flow. In order to gain acceptance by businesses, any new method of exchanging data needs to be simple, easy to implement without disrupting ongoing business and virtually error free.

One approach is to employ an electronic data interchange ("EDI"). An EDI is a dedicated information exchange system that is custom designed to securely exchange data between two business entities. One problem with this method is that it is limited to two parties. This is not helpful for diverse business relationships having multiple facets. The rigid system makes it difficult to share information, especially when multiple partners contribute information among a complex supply chain of component parts. To further complicate matters, the parameters of these components are subject to change by separate interested entities, such as engineering and manufacturing. To expand such a system for access to more than two business entities would require extensive customization to support the disparate systems.

Additionally, several file and data management applications exist for organizing information in remote locations. Companies such as Oracle, SAP, Baan, Manman, and others have developed different types of information management systems called enterprise resource planning (ERP) systems. Most of these systems run on old legacy systems such as mainframes and other large dedicated computer systems. These systems are very rigid, not providing flexibility for different configurations. Also, many companies use several of these different and disparate systems, which are unable to share information compatibly.

For example, some applications require that data be transferred in a horizontal manner, where the data file is delivered having information that appears in a format of rows extending from left to right if, for example, viewed on a user interface. In contrast, other files require data to be transferred in a vertical format, that being a series of data in a single column when viewing the data in a user interface. Accordingly, these systems, being inflexible, will accept and send data.

Another approach could be to develop a standard data format that would require all systems to support it. Unfortunately, this would be an inflexible system that would constantly run into problems with older systems in its implementation. These old systems would still need to be rewritten and possibly customized to support the standard format. Thus, this is an inadequate solution to the problem. It would be more useful if data could be sent to these disparate systems from a single source, regardless of the format requirements at the receiving end of the data. This would obviate the need to modify these systems so that they are compatible with a central data management system.

Therefore, there is a need for a method and apparatus that can access centralized information and allow access to and transmission of information such as change orders according to established business relationships in an organized and useful manner. As will be seen below, the invention does this in an elegant manner.

SUMMARY OF THE INVENTION

A data management system is provided that is designed to automatically propagate changes in information related to a product being designed or manufactured. The product information may be stored in a central location such as a central data base. According to the invention, product information may be transferred to remote locations to systems having disparate formats and protocols. The product information may be configured into a standard format within the central data base and transferred to remote and disparate user locations for use in user's engineering and manufacturing information systems. The invention may further include an administration module communicating with the central data base and configured to validate product data stored in the data base. This would ensure that the centrally stored data is accessible by the system. The system also includes a product change module communicating with the central data base that is configured to poll the central data base to determine whether a change has been made to data related to a product. When changes are discovered by the product change module, a data management server is alerted to the change. The data management server may also incorporate the change module therein. In response to such an alert, the data server is configured to extract, format and transmit the changes in product data from the central data base to an appropriate user system. An application adapter communicating with the user system then receives the changed data from the data server and formats the data according to the user system platform. All aspects of the format protocols are configurable for adaptation of the data to the user system. Other aspects of the invention are described in the more detailed description below.

BRIEF DESCRIPTION OF THE DRAWINGS

FIG. 4 is a flow diagram of the file transfer process occurring within the data management system of FIG. 1 according to the invention; and FIG. 5 is a flow diagram of the application adapter process that is performed in the data management system 102 of FIG. 1.

DETAILED DESCRIPTION OF PREFERRED EMBODIMENTS

Figure 1:
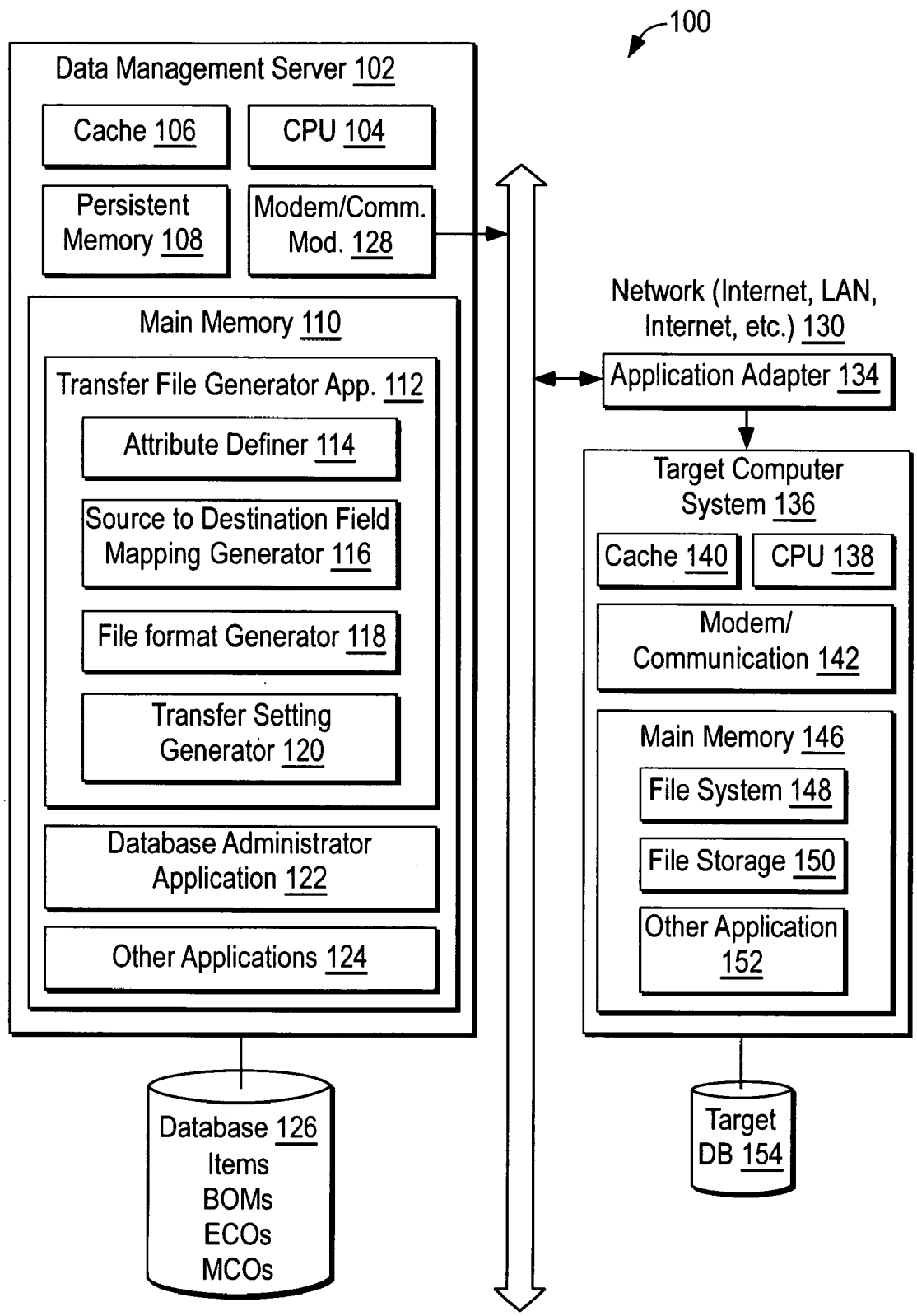
FIG. 1 is a block diagram of a data management system according to the invention.

The invention is directed to a system for managing data related to the design and manufacture of a product. Unlike the prior art, the invention accomplishes this in a platform independent manner to provide compatibility with disparate enterprise resource planning systems. The invention is particularly adapted to systems running multiple software applications and having multiple user interfaces connected to a network and will be described in that context. It will be appreciated, however, that this is illustrative of only one utility of the invention, and that the invention has greater applicability.

The invention may involve a number of functions to be performed by one or more computer processors, such as a microprocessor or and old legacy mainframe computer. The microprocessor may be included in many different forms of computers such as severs and personal computers. The microprocessor may be a specialized or dedicated microprocessor that is configured to perform particular tasks by executing machine readable software code that defines the particular tasks. Applications, data processors, data generators, and other devices will be described that are embodied in a computer in the form of computer readable code that, when executed by a computer, configures the computer to perform the functions of these entities. The microprocessor may also be configured to operate and communicate with other devices such as direct memory access modules, memory storage devices, Internet related hardware, other computers and other devices that relate to the processing and transmission of data in accordance with the invention. The software code may be configured using software formats such as Java, C++, XML and other languages that may be used to define functions that relate to operations of devices required to carry out the functional operations of a computer that employs the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such servers for maintaining information that is frequently retrieved by a central processing unit, but that is not often altered within the persistent memory, unlike the cache memory. Main memory is also included in such servers for storing and retrieving larger amounts of information such as data and software applications configured to perform functions according to the invention when executed by the central processing unit. The main memory may be a disk drive or other volatile memory device. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, nor any commonly used protocol for storing and retrieving information to and from these memory devices respectively.

One aspect of the invention provides a system and method configured to create multiple output formats used to transfer data from a single source to individual and disparate file systems. Once the profile of the individual disparate systems are set up, data can be sent to each system according to their individual file formats. Once the system is set up, the system automatically formats the data to correspond to the individual or target computer systems that are configured to receive the data. The system is first configured according to the correct profile required by target system for receiving data. Once configured properly, the invention provides a unique and useful system that can store data in a central storage location and transfer the data to disparate systems by automatically formatting the files being sent so that they can be received and processed by the target systems.

Referring to FIG. 1, one example of such a system is illustrated embodying the invention. Data management server 102 includes a CPU 104 for controlling the inner workings and data transfer within the data management server. The data management server further includes a cache memory 106 for storing data that is frequently used by the CPU and a persistent memory 108, similar to the cache, for storing hard coded data and other instructions that are frequently used by the CPU.

Main memory 110 is accessible by the CPU and includes data and software applications that, when executed by the CPU, perform the functions according to the invention as well as other functions. Main memory 110 includes a transfer file generator 112 containing software applications for preparing files and transferring them to the disparate systems according to the invention. The transfer file generator sets the profile for the file that includes, among other things, the format under which the file is configured so that it can be transferred, received and processed by the respective target computer system.

The attribute definer 114 is a component of the transfer file generator and is configured to define the attributes of the file to be transferred such as the field names, field lengths, validations, levels of importance or priority of certain fields and other attributes. According to the invention, these attribute properties can be altered to match the properties of the fields in the target computer system to which the file will ultimately be transferred. Attribute labels can be modified to match those of the target system so that they are easily identified. The default attribute lengths can be reduced or increased in order to match those of the target system counterparts, within limits. Attribute formats can be defined as well as a list of elements that contain only valid entries for a particular field. Certain attributes may also be forced when their definition or configuration is required within particular limits. According to the invention, the definition of such attributes can be modified and created in order to conform the file to the particular target system attributes.

It is important to note here that one of the aspects of the invention is to transfer files in either delta form or whole file form. Compatible attribute properties may be critical to a successful file transfer to disparate systems with either type of transfer. In the case of a delta, which is a transfer of only the data that has been changed in a database or other file, it is important that the attribute properties be well defined so that the changes can be incorporated in the corresponding files of the target system. Also, other types of attributes may be defined or created in order to accommodate a particular disparate system. According to the invention, more attributes may be defined such as units of measure, source code (made or bought), class code, vendor, commodity code, ABC code, etc. While many of these attributes may be maintained at the target computer system, they may need to be initially sent to the target system by the data management server when the system is set up. These attributes may be maintained by the data management server or a target computer system, depending on where the control of the data is more desirable.

A source destination field mapping generator 116 is also included within the transfer file generator for, as its name suggests, mapping the field from the source to the destination, or the data management server to the target computer system. In one embodiment of the invention, the mapping generator is configured to map the field within the database 126 to the corresponding fields in the target computer system. The mapping generator allows the configurability of the file so that mappings can be created, modified and verified. This way, a proper profile can be created in the file being transferred so that it can be received and processed by the target computer system. Another attribute of the mapping configuration is the mapping generator's ability to conditionally map certain fields based on an evaluation of the contents or an attribute of a file. One use for this ability is for setting up defaults for fields so that data entry is not required before the file is transferred. For example, if certain fields are to be maintained by the target computer system, it would be useful if the data entry would not be required for the data transfer, allowing the transfer of a file with empty fields that would not be overwritten. This way, these particular fields can be maintained by the target system. One useful application for this would be a manufacturing application, where the target system is an information system used for managing data related to a manufacturing process. In a manufacturing process, certain data is better maintained at the target system, where the manufacturing is occurring. Certain modifications of a product or a component may be made at the manufacturing end and not reported back to the central database 126. In this scenario, it would be useful for the system to have the ability to transfer files with empty data fields so that the data maintained on the manufacturing end would not be updated or otherwise overwritten.

Referring to FIG. 1, file format generator 118 includes software code that is configured to format the data in the file so that it is compatible with the target computer system. Proper formatting of the file, like other attributes, may be critical to avoid losing data or failing to transfer data. The file format generator may be configured to adapt formats to a wide variety of disparate target systems. Two major types of formatting criteria are horizontal and vertical orientation formats. In a vertical format, blocks of data are transferred in a single column form, the fields being of a predetermined length. In a horizontal format, the data is transferred in a row form, where rows of data fields are transferred and stored in rows. Depending on the processing system of the target system, either the vertical or horizontal may be advantageous, but it also may be required. The file format generator allows a file to be configured in either manner in order to comport with the target system.

The transfer setting generator 120 establishes the transfer settings, which are attributes that are set to be unchanged throughout a file transfer period. For example, the transfer setting generator may set particular format in which the file would be transferred. These settings would not be changed throughout the transfer process.

The data management server further includes a database administrator 122 for managing the database 126. The database administrator is configured to allow the data management server to enforce validations for field lengths, lists of values such as units of measure, field format and case. The database administrator is further configured to identify required fields for the data management server-target computer system interface. For example, it may not be desired to transfer certain change orders until particular changes are released. For example, a bill of material (BOM) maintained in the database may experience changes as a result of a product change or modification. The entity and control of the data located within the BOM may make certain changes to product information and release them at a later time. In this event, it would be desired that the data not be transferred in a transfer file until it is released. The database administrator will enforce this rule and not allow the data to be transferred out of the database and into a file until it is in fact released. This, of course, implies that there is a certain hierarchical authority to administering the database. Preferably, the predetermined settings within the database that is established by the administrator would be configured to enable the proper transfer of data from the database to the target computer system. These rules may be changed accordingly in order to facilitate proper file transfer. For example, certain rules can be established that are particularly relevant to certain products. Requiring items to be released before it can be transferred is one type of administration tool, which ensures that certain BOM items are not released along with unreleased parts. Assemblies and the individual components, for example, should all be valid parts so that they interconnect. Disallowing the transfer of released items can ensure that this does not occur. Another similar rule is to deny users from unreleasing certain items from a change that has been released. This prevents users from meddling with predetermined procedures for transferring files that are designed with proper product processes in mind.

The database 126 may include items, which may be identifiers of certain parts, such as part numbers. Items can have various levels of descriptions including the name of the item, description, type, size, validations, links and other descriptions.

BOMs may include items along with the description on how the product is made from its components and subassembly as well as different material. For example, a BOM may include identification of a particular item, vendor part number, vendor code, manufacturer's name, date of the transaction and other information related to a particular part. BOMs are maintained typically in the central database, as changes are commonly made to BOMs throughout manufacturing and design processes of product.

The database further may include ECOs and MCOs as discussed above in the background, representing change orders from both the engineering and manufacturing arms of the process. For example, separate target computer systems could govern the management of data related to the ECOs and the MCOs. ECOs may be issued and released by a target computer system managing data of an engineering department. Change orders issued for products that are in engineering will be maintained in the database as ECOs. Similarly, manufacturing change orders may be maintained in our computer system that manages the data for the manufacturing process of a product. For this application, the manufacturing change orders are maintained in the database and issued therefrom.

Other applications 124 are also included in main menu of the data management server in order to enable other functions performed by the data management server.

The data management server communicates with network 130, which could be an intranet, LAN, the Internet or other type of network that allows the data management server 102 to communicate with the application adapter 134 which processes files to be transferred to the target computer system 136. In operation, the data management server 102 communicates with the Internet via modem 128, which could be a telecommunication based modem or other type of communication module for communicating with target computer system via the network.

The application adapter is configured to receive a file transferred from the data management server and is responsible for certain actions to ensure proper reception of files sent from the server. The application adapter can be very versatile so that the target computer system can receive files from the database, regardless of the original format in which it is stored. When the file is sent from the data management server, it is a flat ASCII file, also known as a record relative file or record oriented file, containing information pertinent to item and BOM changes that have been created and released in the database. This flat file is received by the application adapter along with its profile information, which, as discussed above, sets the attributes, the field mapping, the formats and the transfer settings of the information from the database. The application adapter has many roles. One is to receive the files generated by the data management server and to parse the files out so that each of the fields within the file can be associated with the appropriate field within the target computer system 136. The application adapter also may be required to validate the field entries from the file transferred with the appropriate data within the target computer system. The data within the target system may then be updated, if valid, with the new data. The application may also have a lockout deployed to ensure that certain fields are not updated during the performance of a business application, such as the manufacture of a product, to ensure that the performance of such an application is not affected. For example, the release of an MCO of a product that is being produced, if promiscuously transferred, may affect the actual product being produced on a line. Another useful function of the application adapter is to stop the processing of a file transfer if erroneous information is being transferred. The application adapter may be able to pre-process all records within a file and then doing a secondary process to detect errors, correct the errors, and attempt to process the file again. The application may also provide file management after the processing of the transfer files so that the files are properly stored within the target computer system. Error reports can also be generated by the application adapter for transfer files and other change orders which do not parse or which do not validate properly. Additionally, on-demand reports can be produced to enable users to retrieve information regarding the status of a transfer file or change order which have already been processed or reviewed by the application adapter. Scheduling routines can also be included with the application adapter to allow a routine engagement of the application adapter over particular time periods. This would allow for scheduled updates of information during, for example, manufacturing process, so as not to interfere with the process itself. Many of the applications may be configured into the application according to the invention so as to further enable the transferability of items, BOMs, ECOs and MCOs from the database to the target computer system 136.

Target computer system 136 may include a CPU 138 for performing file transfer to, from and within the target computer system 136, as well as performing other internal functions of the target computer system. The system may further include a cache memory 140 for storing data that is frequently used by the CPU, giving a CPU easy access to the frequently used data. The modem/communication module 142 allows the target computer system to communicate with outside entities via the network and application adapter. Main memory 146 is accessible by the CPU and is configured to store the file systems that are transferred to the target computer system. Applications for performing different functions of the target computer system by the CPU executing the application code is also stored in main memory. File systems may be managed by file system application 148. Files may be stored in file storage 150. Other applications 152 are also stored in main memory for enabling a CPU to perform other functions of the target computer system. Other applications may also include a database administrator for administering the target database 154, used for storing different types of information pertaining to the target system.

Figure 2:
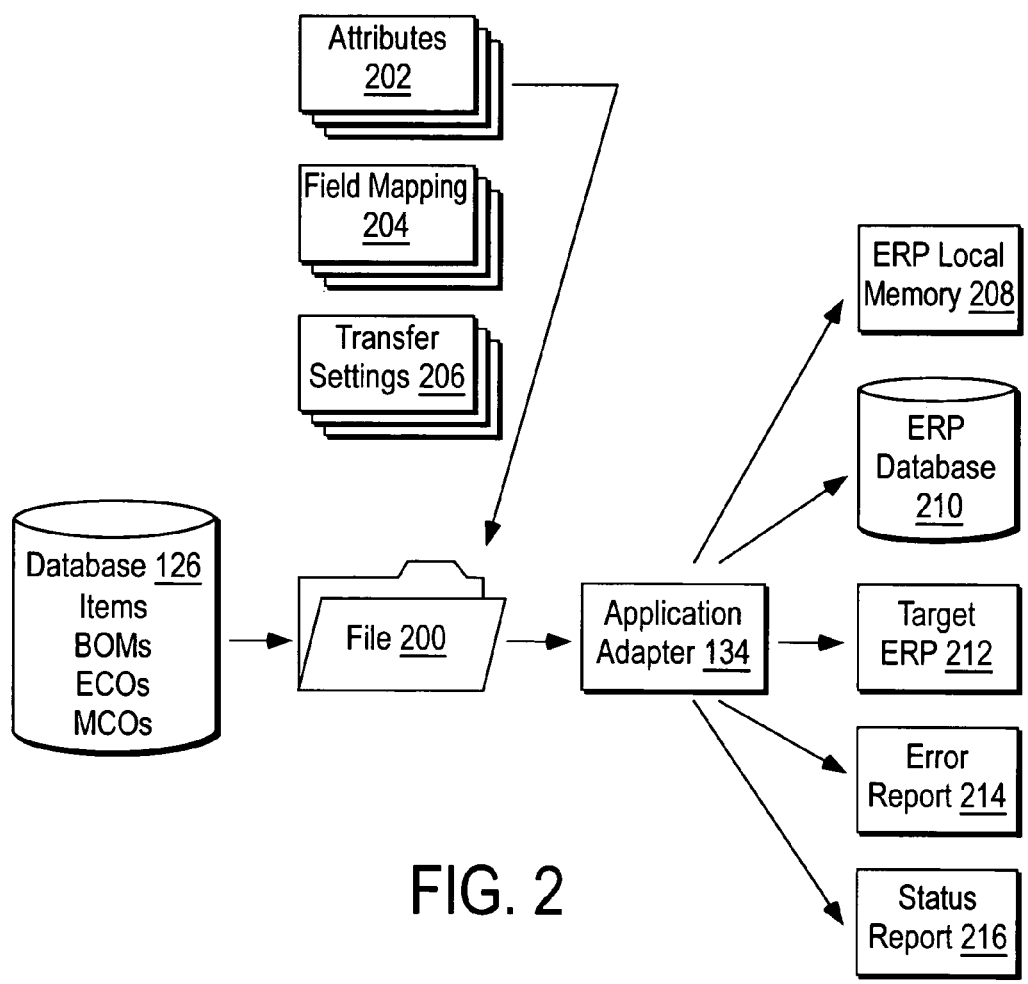
FIG. 2 is a architecture flow diagram of the data management system of FIG. 1.

Referring now to FIG. 2, a functional flow diagram as illustrated of the data management system 100 of FIG. 1. In operation, the file 200 receives items or other data from the database 126 before being transferred to a target system such as an enterprise resource planning (ERP) system as illustrated in this FIG. 2. Before the file is transferred, attributes 202, field mappings 204 and transfer settings 206 are incorporated into the data file so that a proper transfer to the target ERP system will occur. Once these profile features are incorporated into the file, the file is sent to application adapter 134 for processing before use within the target system. The files processed in the application adapter are then transferred to different entities within the target ERP. The processed file may be stored in the ERP local memory 208 or even the ERP database 210 (similar to target database 154 of FIG. 1). The file may also be sent directly to the target ERP system 212 for immediate processing and use by the system. An error report 214 may be produced by the application adapter in the event that the file is somehow deficient such that it cannot adapt for the target ERP system. The status report 216 may also be produced by the application adapter in order to give a user of the target ERP system a status report of files being transferred or that have been transferred.

Figure 3:
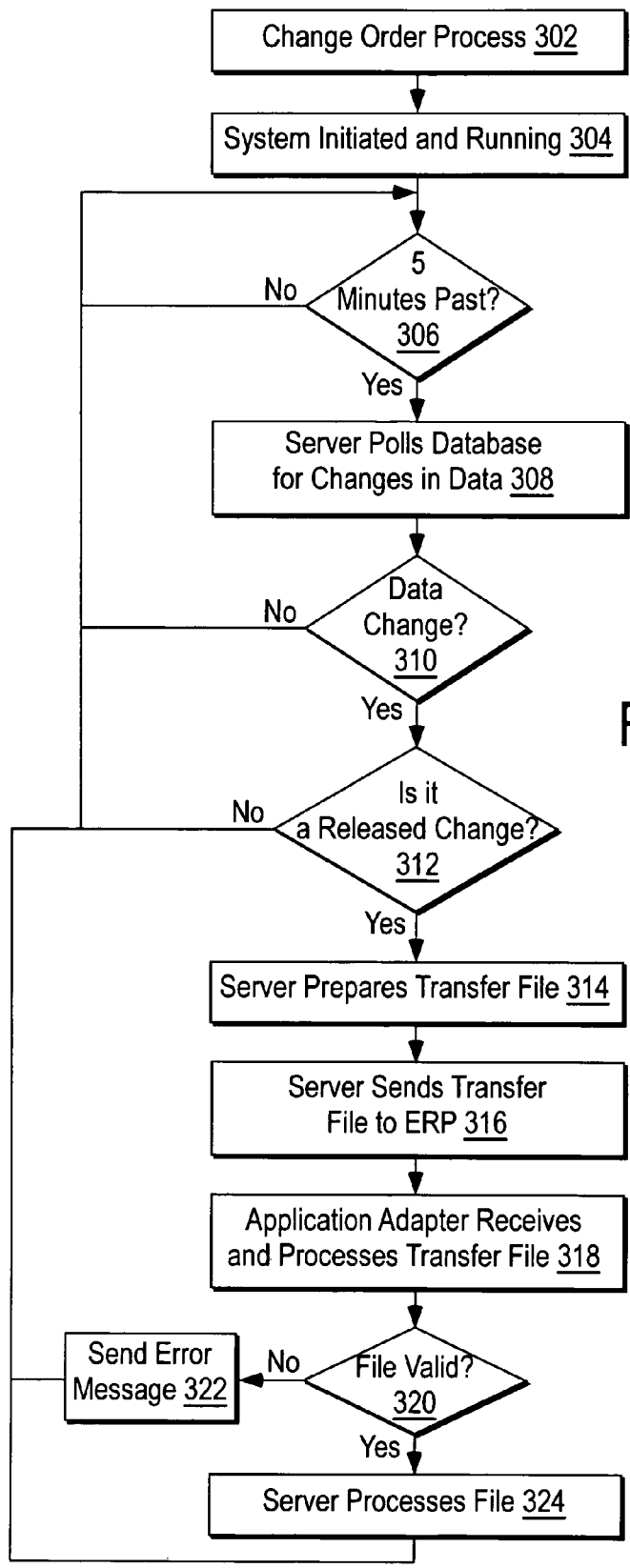
FIG. 3 is a flow diagram illustrating the change order process performed in data management system of FIG. 1.

Referring now to FIG. 3, a flow chart illustrating the change order process is shown. The process when the system is initiated and running in step 204. The process immediately proceeds to step 306 where a timer is cycled until a predetermined time period passes, such as the five minutes illustrated. Once the five minutes is passed, the process proceeds to step 308 where the data management server polls the database for changes in data. In the search, the server may be searching for ECOs and MCOs that may appear in the database. If no change has occurred, such as no ECOs nor MCOs appearing, the process returns to step 306 for another five minutes waiting period. If a data change is found in step 310, the process proceeds to step 312 to determine whether or not the change found is a released change. As discussed above, it may be preferred that only released changes be processed and transferred. If the change is not released, the process again returns to step 306 for another five minute waiting period. If the change has been released, then the process proceeds to step 314 where the server prepares a transfer file to be sent to a target computer system. At this step, the server must perform a file transfer process according to a file transfer protocol (FTP) or copy the file to a local server destination.

Referring now to FIG. 4, this file transfer process 402 is illustrated in a flow diagram. In step 404, the server is the signal indicating a change order release, such as a ECO or MCO, has been found in the database. This typically will occur when a change order is issued by the controlling entity of the database. For example, the data management server and database may be connected in the same geographic location within a product manufacturing corporation. In different areas within the corporation, engineering and manufacturing departments exist in separate locations. These departments often have target computer systems that individually manage the data for the different departments or divisions, such as engineering and manufacturing. These could be characterized as two separate ERPs. Each of these ERPs would have its own application adapter and separate target computer system for receiving data files from the data management server database (database 126 of FIG. 1) via the data management server. Product managers within the company or some other type of entity separate from engineering or manufacturing, may control the database with respect to ECOs and MCOs. Once a change is made and the change has been released, the data management server detects the change as a result of its polling routine discussed in connection with FIG. 3. This is where the data management server receives a signal indicating a change order release in step 404 of FIG. 4.

The process then proceeds to step 406 where the server creates separate files for each change of data or change order to be transferred. In the next step 408, the server sets the layout of the file according to target system profile for either a delta transfer or a full record transfer. If there is a delta transfer, only the items that have been changed within the BOM as indicated by the ECO or MCO. If it is a full record, however, the entire file contents are transferred to the respective target computer system in order to update the target system's file storage. The process then proceeds to step 410 where the server inserts the delimiters into files according to the target system profile. Delimiters are indicators or flags that separate the fields of data. These can be in the form of commas, spaces, semicolons or other characters that indicate a separation in the data field. Data fields may also be separated, such as in the vertical sense, by simply following other fields in a sequence in a collimated orientation. The process then proceeds to step 412 where the server formats the data of the transfer into the file. This is important for transfers to the different target computer systems, which all need to keep track of the latest versions of changes to the product data. In the final step of the file transfer process, step 416, the server sends the file to the application adapter associated with the target computer system according to the file transfer protocol. The transfer is almost compete.

Referring again to FIG. 3, the process proceeds to step 318 where the application adapter receives and processes the transfer file. The application adapter then proceeds with an application adapter process 502, referring to FIG. 5, to process the file at the location of the target computer system. This step corresponds with step 504 of FIG. 5. The process then proceeds to step 506 where the application adapter begins to parse out files within the transfer file according to the fields separated by the delimiters. In this process, each field may be retrieved by the application adapter as separated by the file's delimiters. In step 508, each field entry is validated from a transfer file with corresponding data from the target system. Since the corresponding data is presumed to preexist in the target computer system, and the transferred file is presumed to be an update of a full file or a delta, only the changed information, and it is presumed that corresponding data exists within the file storage or target database of the target computer system. A comparison is made in step 510 showing whether or not the file is valid. This validation may take the form of comparing certain attributes of the transferred file that is associated with the data field compared to the corresponding information within the file system of the target system. If the file is not valid, the process proceeds to step 512 where an error message is sent to a predetermined recipient alerting the recipient that there is an error in the file. This error message could be sent back to the data management server, a user at the target computer system, or some other affiliated user.

At this point, the application adapter process may proceed to preprocess all records within the transfer file in step 513 and store that information for later validation. This is a useful process in that it allows the process to continue, giving the file a second chance at validation so that the process is not simply aborted. If it is truly invalid and the application adapter can not process the file, the process returns to step 504 where the application adapter awaits another transfer file.

If, however, the field entry is found to be valid, the target system data is updated in step 514, whether it be located in file storage or the target database. Optionally, a file management application may be applied to the file in step 516 so that the file is properly stored. The process is then complete and returns to step 504, with respect to the application adapter, where the application adapter awaits another transfer file.

Returning again to FIG. 3, once the application adapter process is completed, if the file is found to be invalid in step 320, an error message is sent in step 322 and the process returns to the polling routine in step 306, where the data management server continues to poll the database for changes in product information. If the file is valid, the server process is complete and the process returns to step 306 where the database continues to be polled by the server.

The invention is directed to a system for managing data related to the design and manufacture of a product. Although this embodiment is described and illustrated in the context of a data management server communicating with one or more target computer systems via a network, the scope of the invention extends to other applications where efficient and compatible transfer of data would be useful. Furthermore, while the foregoing description has been with reference to particular embodiments of the invention, it will be appreciated that these are only illustrative of the invention and that changes may be made to those embodiments without departing from the principles of the invention, the scope of which is defined by the appended claims.

The invention claimed is:

1. A data management system including memory storage for storing software code that, when executed configures and controls the system to perform the functions of automatically propagating changes in information related to a product being designed or manufactured, from a central location to remote and disparate user information systems having varying data formats, comprising:

a central data base under the control of said software code for storing and maintaining data that is related to a business process for manufacturing a product, including component serial numbers, change orders, and information pertaining to products, and is configured to format the data according to different aspects of the manufacturing business process for transfer to remote and disparate user information systems;

an administration module stored in said memory storage and under the control of said software code communicating with the central database and wherein said software code that, when executed by a microprocessor, configures the administration module to validate data related to a product by confirming the correct field length of data related to a product, the correct field format of the data, the correct list of values of the data including units of measure and the correct required fields for the transfer of reformatted data in a reformatted data file to disparate user information systems having disparate data formats;

a product change module stored in said memory storage and under the control of said software code, and communicating with the central data base and having software code that, when executed by a microprocessor, configures the product change module to poll the central data base to determine whether a change has been made to data related to a product; and to send a signal to the data server upon the detection of a change of product data in the central data base to incorporate said change in the data related to the product; and a data server stored in said memory storage and under the control of said software code that, when said code is executed by a microprocessor, configures the data server to generate a reformatted file and to extract, format and transmit changes in data stored in the central data base in the form of the reformatted file containing reformatted product data to separate user systems, the data being extracted, formatted, and transferred according to predefined criteria including predetermined data formats, file attributes, and requirements of the disparate information systems.

2. A system according to claim 1, wherein the product change module is incorporated into the data server in the form of software code, which, when executed by the data server, configures the data server to perform the functions of the product change module to update existing product data upon the detection of a change in product data in the central data base, and wherein attribute properties of the file in the data server can be altered to match the properties of the fields in the target computer system to which the file will ultimately be transferred.

3. A system according to claim 1, wherein the application adapter is configured to validate data changes sent by the data server, to update a user system database after data changes are validated and to generate status reports according to predefined criteria for the user system.

4. A system according to claim 1, further comprising a client information system configured to receive the data changes from the data server and to display the data for a user.

5. A system according to claim 1, further comprising a client computer system configured to modify predefined criteria used by the data server to transmit the data changes, wherein attribute properties of the file in the data server can be altered to match the properties of the fields in the target computer system to which the file will ultimately be transferred.

6. A system according to claim 1, wherein the central data base is configured to store data pertaining to financial information.

* * * * *